(12) United States Patent
Mateer

(10) Patent No.: US 11,935,072 B1
(45) Date of Patent: Mar. 19, 2024

(54) MULTI-MODAL TRANSPORTATION BAGGAGE SCREENING AND IMAGE SHARING SYSTEM

(71) Applicant: Craig Mateer, Orlando, FL (US)

(72) Inventor: Craig Mateer, Orlando, FL (US)

( * ) Notice: Subject to any disclaimer, the term of this patent is extended or adjusted under 35 U.S.C. 154(b) by 0 days.

(21) Appl. No.: 18/197,840

(22) Filed: May 16, 2023

(51) Int. Cl.
| | |
|---|---|
| *G06Q 30/018* | (2023.01) |
| *G01N 23/046* | (2018.01) |
| *G01N 23/10* | (2018.01) |
| *G06K 7/10* | (2006.01) |
| *G06K 7/14* | (2006.01) |

(52) U.S. Cl.
CPC ......... *G06Q 30/018* (2013.01); *G01N 23/046* (2013.01); *G01N 23/10* (2013.01); *G06K 7/1413* (2013.01); *G06K 2007/10524* (2013.01)

(58) Field of Classification Search
None
See application file for complete search history.

(56) References Cited

U.S. PATENT DOCUMENTS

| | | | |
|---|---|---|---|
| 7,830,254 | B2 | 11/2010 | Huey et al. |
| 8,600,149 | B2 | 12/2013 | Song et al. |
| 10,042,078 | B2 | 8/2018 | Sarraiocco |
| 10,366,293 | B1 * | 7/2019 | Faviero ............... G06N 3/08 |
| 10,504,261 | B2 | 12/2019 | Cinnamon et al. |
| 11,663,574 | B2 | 5/2023 | Martinez de Velasco Cortina et al. |
| 2005/0258231 | A1 * | 11/2005 | Wiater ............. G06Q 10/087 340/5.1 |

(Continued)

FOREIGN PATENT DOCUMENTS

| | | | |
|---|---|---|---|
| EP | 3709239 A1 | * | 9/2020 |
| JP | 7009743 B2 | * | 1/2022 |
| WO | 2006082521 A2 | | 8/2006 |

OTHER PUBLICATIONS

"Southwest Airlines Offers Cruise-Goers a Hand With Their Bags," Oct. 9, 2007, available online at https://www.southwestairlinesinvestor-relations.com/news-and-events/news-releases/2007/09-10-2007 (Year: 2007).*

(Continued)

*Primary Examiner* — Jan P Mincarelli
(74) *Attorney, Agent, or Firm* — Anton J. Hopen; Smith & Hopen, P. A.

(57) ABSTRACT

The present invention relates to a method for streamlining baggage screening across modes of transportation. The method includes scanning a baggage item at an airport by a first security authority (FSA) and uploading scanned baggage imagery and license plate identification to a secure cloud storage system managed by a second screening authority (SSA). The SSA generates a screening manifest from the license plate identification, which lists additional modes of transportation requiring different screening rules. The SSA reanalyzes the stored baggage imagery according to these rules, determines compliance, and creates a baggage authorization record. Based on the compliance result, represented by an indicium affixed to the baggage, a trusted custody handler can directly deliver the baggage to the next mode of transportation without additional screening, or direct it for further physical screening if non-compliant. This system improves efficiency and security in multi-modal transportation networks.

20 Claims, 8 Drawing Sheets

(56) References Cited

U.S. PATENT DOCUMENTS

| | | |
|---|---|---|
| 2015/0371453 A1 | 12/2015 | Gallo et al. |
| 2018/0121804 A1 | 5/2018 | Mohamadi |
| 2022/0082721 A1 | 3/2022 | Holifield et al. |
| 2022/0381941 A1 | 12/2022 | Fortune et al. |

OTHER PUBLICATIONS

Schwaninger et al. "Single-View, Multi-View and 3D Imaging for Baggage Screening: Why should it be considered for effective training?" Mar. 2019, pp. 32-35. Aviation Security International.
Paul Evans "Three-dimensional X-ray Imaging for Security Screening" Journal, 2015. pp. 19-28.

\* cited by examiner

MULTI-MODAL TRANSPORTATION BAGGAGE SCREENING AND IMAGE SHARING SYSTEM

BACKGROUND OF THE INVENTION

1. Field of the Invention

This invention relates to the field of transportation and more specifically, security screening of checked baggage.

2. Brief Description of the Related Art

Traveling via various modes of transportation often requires undergoing a process of security screening to ensure the safety and security of all passengers. This process, though seemingly straightforward to the traveler, is a complex system of checks and balances that utilizes both human and technological resources.

In airports, the process starts when a passenger checks in their luggage. The check-in staff assigns a unique barcoded tag simultaneously assigning an electronic Baggage Source Message (BSM) to each piece of baggage, which is tied to the passenger's ticket information. After check-in, the baggage is sent through an automated conveyor system to the baggage handling area. The initial screening process is performed by large X-ray machines. These machines are designed to detect a range of materials, including explosives and other contraband. Baggage is screened using dual-energy X-ray systems that allow security personnel to differentiate between organic and inorganic materials based on their atomic number. This helps in identifying potentially dangerous substances. If the X-ray scan shows something suspicious, the bag is diverted for further inspection. This usually involves a physical inspection by a trained security officer and may also involve the use of more advanced scanning technologies like CT (Computed Tomography) scanners, which can provide a more detailed, 3D images of the bag's contents. In some cases, explosive trace detection (ETD) machines may also be used. These machines can detect traces of explosives on the outside of the bag or on the items inside the bag. They work by swabbing the bag or item and then analyzing the swab for any explosive residue.

The baggage screening process in cruise ships is like that in airports, though with some differences owing to the unique nature of maritime travel. When passengers arrive at the cruise terminal, their luggage is checked in and tagged. The luggage then goes through large X-ray machines like those used in airports. These machines scan the bags for prohibited items, which can range from weapons and explosives to items that are not allowed on the ship, like alcohol or irons. If a bag triggers an alarm during the X-ray scan, it is set aside for further inspection. This usually involves a hand-search by security personnel. If a prohibited item is found, it is typically confiscated and may be returned to the passenger at the end of the cruise. In addition to the initial baggage screening, passengers and their carry-on items are also screened before boarding the ship. This is usually done using walk-through metal detectors and X-ray machines like those used in airport security checkpoints.

Security procedures in railway systems vary widely depending on the country and the specific rail service. However, many major rail systems employ some form of security screening for both passengers and their luggage. In some cases, this might involve random checks where security personnel select bags for screening using handheld metal detectors or portable X-ray devices. In other cases, all bags might be screened using stationary X-ray machines like those used in airports and cruise terminals. In high-security situations or for international train services, more thorough screening procedures may be employed. This can include the use of explosive detection systems, sniffer dogs, or even CT scanners. Additionally, passengers may also be screened using metal detectors or body scanners.

The Transportation Security Administration (TSA) uses various imaging technologies to screen baggage, including X-ray scanners and computed tomography (CT) scanners. These technologies produce images in different formats, including 2D and 3D. X-ray scanners are commonly used for screening checked and carry-on baggage. They generate 2D images by projecting X-rays through the baggage and capturing the radiation that passes through the items. The images produced can show the shape and density of objects inside the baggage, which helps identify potential threats. Computed tomography (CT) scanners are more advanced than traditional X-ray scanners and are increasingly being used for screening baggage. They use X-ray technology to take multiple images from different angles, and then a computer combines these images to create a 3D representation of the baggage contents. CT scanners offer higher resolution and more detailed images, allowing security personnel to better identify potential threats and reduce false alarms.

Several vendors manufacture CT scanners used by TSA for baggage screening. Some of the prominent vendors include:

Smiths Detection: Smiths Detection is a leading provider of advanced security solutions, including CT scanners. Their HI-SCAN XCT series scanners, like the HI-SCAN 6040 XCT and HI-SCAN 7555 XCT, are designed for screening checked and carry-on baggage at airports.

L3Harris Technologies: L3Harris Technologies is another major supplier of security equipment, including CT scanners for baggage screening. The company's CLEARSCAN brand family of CT scanners is used by TSA at various airports in the United States.

Analogic Corporation: Analogic Corporation develops advanced imaging technologies, including CT scanners for airport security. Their CONNECT brand series of scanners, such as the CONNECT 70 and CONNECT 100, are designed to enhance airport security screening.

Leidos (previously Lockheed Martin): Leidos is a global technology company that provides security solutions, including CT scanners for baggage screening. They have developed the VACIS M6500 system, a high-performance CT scanner for screening baggage at airports.

CT images generated during baggage screening are typically saved in a multi-image format. This format allows for the exchange, storage, and transmission of images across different systems and devices. CT scanners capture a series of 2D cross-sectional images, which can then be reconstructed into a 3D representation of the scanned object. The 3D visualization and analysis of CT images often involves specialized software designed for processing and rendering the multi-image files. These software solutions can reconstruct the 2D slices into 3D models, enabling security personnel to examine the scanned baggage in more detail.

The DICOS (Digital Imaging and Communications for Security) standard is an image format standard developed by NEMA (National Electrical Manufacturers Association) in collaboration with the U.S. Department of Homeland Security (DHS). It aims to enhance the interoperability and effectiveness of security screening systems, such as those used in airports and other critical infrastructure facilities.

DICOS is designed to meet the specific needs of security imaging, including the storage, transmission, and processing of security images. It addresses the limitations of the DICOM (Digital Imaging and Communications in Medicine) standard, which is primarily focused on medical imaging. The DICOS standard provides:

a. Interoperability: DICOS enables seamless communication between different security imaging systems and components from various manufacturers, allowing for more efficient and effective security screening processes.

b. Extensibility: The DICOS standard is designed to be easily extended and adapted to incorporate modern technologies and methods as they emerge in the field of security imaging.

c. Flexibility: DICOS supports a wide range of security imaging modalities, including X-ray, CT, MRI, and others, making it suitable for various security applications.

The size of TSA files can vary significantly depending on several factors such as the scanner's resolution, the number of slices captured, the level of compression applied, and the size of the baggage being scanned. In general, CT scans produce many high-resolution images, which can result in substantial file sizes. A single multi-image file for a CT scan can range from a few hundred kilobytes to several megabytes. When considering an entire baggage scan, which may include multiple files, the total size can easily reach several tens or even hundreds of megabytes.

It is not uncommon for travelers to pass along several modes of transportation and governmental agencies for screening. For example, taking an airline flight to a port and then sailing on a cruise from there. However, for security purposes, different modes of transportation can have different security requirements. What a traveler is permitted on a flight may be different than what is permitted on ship. The specific list of prohibited items may vary between cruise lines, but some common items that are allowed on airplanes but prohibited on cruise lines include:

a. Alcohol: Many cruise lines have strict policies on bringing personal alcohol on board. While you can carry a limited amount of alcohol in your checked luggage on an airplane, cruise lines often restrict or limit the amount you can bring onboard.

b. Power Strips: Power strips, surge protectors, and extension cords are typically allowed in airplane carry-on or checked luggage, but many cruise lines prohibit them due to potential fire hazards.

c. Clothing Irons: Clothing irons are usually allowed in checked luggage on airplanes but are often prohibited on cruise ships. Cruise ships typically provide laundry services or self-service laundry facilities with irons.

d. Pool Inflatables: While these items are allowed on airplanes, they may not be permitted on cruise ships due to limited pool space and safety concerns.

e. Drones: Some airlines allow drones as carry-on or checked luggage, but most cruise lines prohibit them for safety and privacy reasons.

f. Hoverboards and similar devices: These items are typically allowed on airplanes if they meet specific battery requirements. However, many cruise lines ban them due to fire hazards and safety concerns.

g. Sporting equipment: Some cruise lines may restrict or prohibit specific sporting equipment, such as baseball bats or golf clubs, which are allowed in checked luggage on airplanes.

Similarly, items allowed on airplanes but may be prohibited or restricted on trains (railways) include:

a. Large luggage: While airlines typically allow checked luggage with size and weight limits, trains often have stricter size restrictions or limited storage space for large suitcases.

b. Bicycles: Many airlines allow bicycles as checked luggage, but not all trains permit bicycles, or they may require a reservation and additional fees.

c. Sporting equipment: Some trains may restrict or prohibit specific sporting equipment, such as surfboards, skis, or golf clubs, which are allowed in checked luggage on airplanes.

d. Camping gear: Camping gear like portable stoves, fuel canisters, and tents with stakes may be allowed in checked luggage on airplanes but could be restricted or prohibited on trains.

e. Musical instruments: While airlines often allow musical instruments as carry-on or checked luggage, some trains may have size or weight restrictions for these items.

f. Hazardous materials: Items such as flammable liquids, compressed gases, or corrosive substances may be allowed in limited quantities on airplanes, but trains may have stricter regulations.

In collaboration with the U.S. Coast Guard and Customs and Border Protection (CBP), and railway/train, and hotel/resort security agencies and the TSA, they establish security guidelines and regulations for cruise lines, airline, rail passengers, and hotel/resort guests and their baggage to ensure the safety and security of all travelers. This includes passenger and baggage screening procedures, restricted items list, and other safety measures unique to each mode of transportation or governmental agency.

SUMMARY OF THE INVENTION

The present invention includes a method for enhancing the efficiency of baggage screening across modes of transportation. The process begins with the scanning of a baggage item by a first security authority (FSA) using a computed tomography imaging system, which exports the content images of the baggage to a collection. The baggage item's machine-readable license plate identification and or the Baggage Source Message (BSM), which uniquely identifies the baggage and associated passenger data, is also scanned. This data, including the imagery collection and license plate identification and or Baggage Source Message, is then uploaded to a secure cloud storage system managed by a second screening authority (SSA).

The SSA extrapolates a screening manifest from the license plate identification and or the Baggage Source Message, detailing any subsequent modes of transportation that require baggage screening under differing rules and regulations. The stored baggage imagery is reanalyzed according to these specific rules, and a compliance result is determined. This result is represented by an indicium affixed to the baggage, which directs whether the baggage is to be delivered directly by a trusted custody handler or sent for additional physical security screening.

The method also proposes using the Digital Imaging and Communication in Security (DICOS) standard for collecting baggage imagery. A passenger name record (PNR) is extracted from the baggage license plate identification and or the Baggage Source Message (BSM) to obtain the owner's travel plans. To ensure privacy, a hash of the license plate identification is generated at the secure cloud storage system, keeping the passenger details unknown to the entity conducting the reanalysis.

Additional features include affixing an adhesive label to the baggage indicating security compliance results and providing information on why a negative compliance result was returned. The system also visually annotates the baggage imagery during reanalysis to highlight objects causing negative compliance results. The owner of the baggage is electronically informed if there is a negative compliance result, with an explanation chosen from a standardized list. Annotated images of objects causing negative results are forwarded to the security entity at the second mode of transportation, encrypted and signed with a public/private key pair by the SSA for security reasons.

BRIEF DESCRIPTION OF THE DRAWINGS

For a fuller understanding of the invention, reference should be made to the following detailed disclosure, taken in connection with the accompanying drawings, in which.

DETAILED DESCRIPTION

In the following detailed description of the preferred embodiment, reference is made to the accompanying drawings, which form a part hereof, and within which specific embodiments are shown by way of illustration by which the invention may be practiced. It is to be understood that other embodiments may be utilized, and changes may be made without departing from the scope of the invention.

Figure 1:
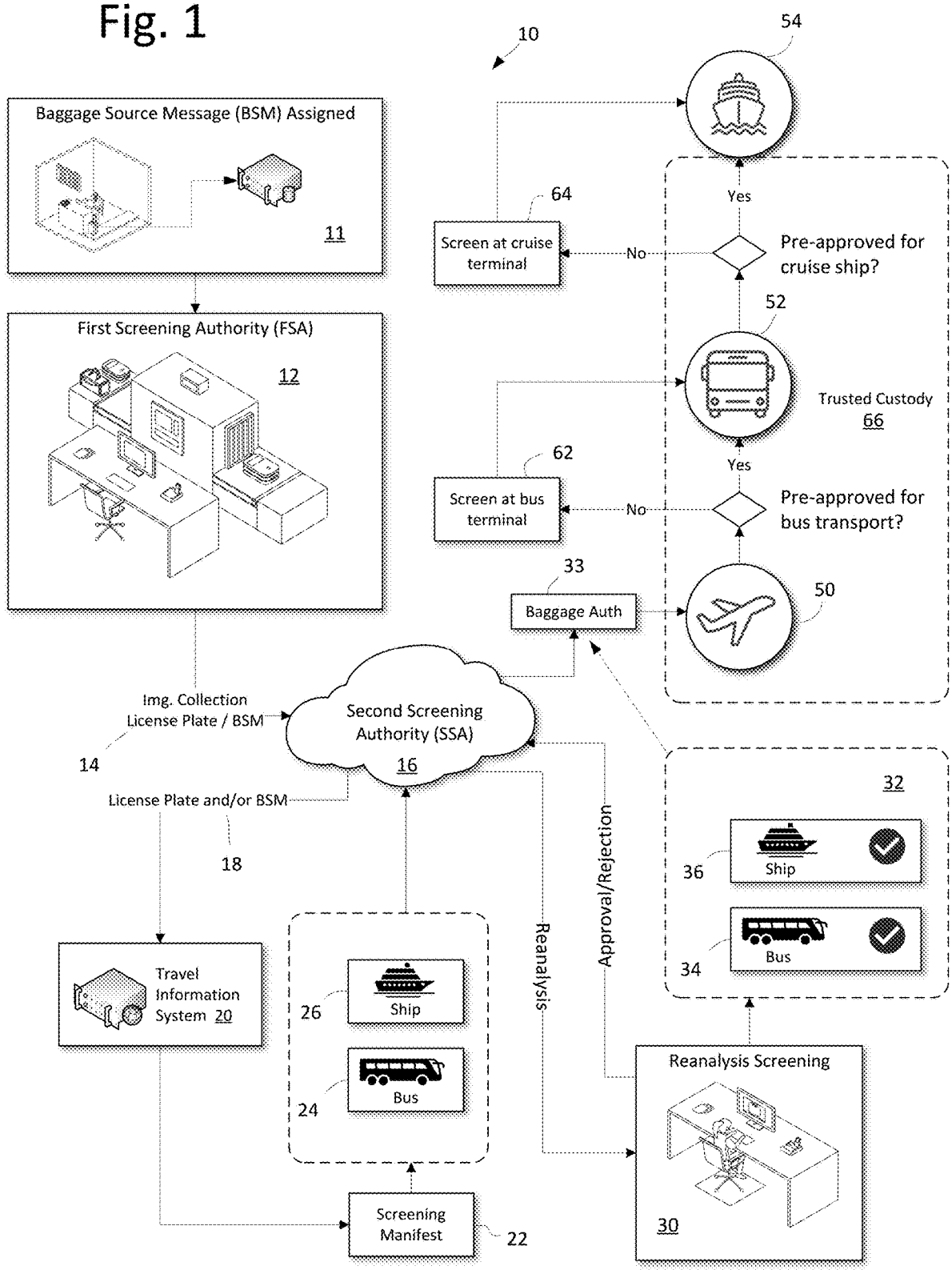
FIG. 1 is a diagrammatic view of an embodiment of the invention.

FIG. 1 provides a schematic depiction of an embodiment of the invention denoted generally as reference numeral 10. First security authority (FSA) 12 screens a checked bag using X-ray and/or computed tomography imaging. Images are obtained in the initial scanning process along with the license plate and or Baggage Source Message (BSM) of the checked bag (collectively 14). The images and license plate and or Baggage Source Message (BSM) are securely transmitted to second screening authority (SSA) 16. SSA 16 passes license plate and/or Baggage Source Message (BSM) 18 to travel information system (TIS) 20 which extracts from the license plate and/or Baggage Source Message (BSM) 18 additional information on the passenger including the travel itinerary to produce a screening manifest 22. This process is enumerated in U.S. Non-Provisional application Ser. No. 18/104,359 filed Feb. 1, 2023, and entitled "Return Leg Remote Passenger Check-In." The specification thereof is incorporated herein by reference. In the example of FIG. 1, the screening manifest 22 indicates after arriving at a destination airport, the passenger's checked bags will be transported by bus or truck 24 to cruise ship 26. SSA 16 transmits or makes available screening manifest 22 to reanalysis screening 30. Reanalysis screening 30 may take place at the physical location of SSA 16 or may be conducted by secure remote connections by qualified and authorized screening individuals. In this case, reanalysis screening instance 32 of the images are conducted for the rules and regulations promulgated for bus or truck travel 34 and shipboard travel 36. An approval or rejection under the rules and regulations for each mode of transport is conveyed back to SSA 16 which produces a baggage authorization record 33.

From the time the baggage was checked at the airport it has been within trusted custody 66 meaning that unauthorized individuals including the owner of the baggage do not have direct access to the contents. Therefore, there is no opportunity for the passenger to change the contents of the baggage while it is under trusted custody 66. Checked baggage in airline, bus, rail and maritime or additional governmental agencies is released to the custody of the transportation entities or holding facility. Upon receiving baggage authorization record 33, airline 50 (and/or its designated partners or authorized entities) may move the checked baggage directly to bus line or truck 52 instead of rescreening at the bus terminal 62 because reanalysis 30 determined that the contents of baggage met the rules and regulations for bus travel 34. Furthermore, once the checked bags are transported by bus line or truck 66 to the cruise ship terminal, they already have cleared reanalysis for shipboard travel 36 so the baggage is not rescreened at the cruise ship terminal 64 but delivered directly to the passenger's stateroom on the ship.

Figure 2:
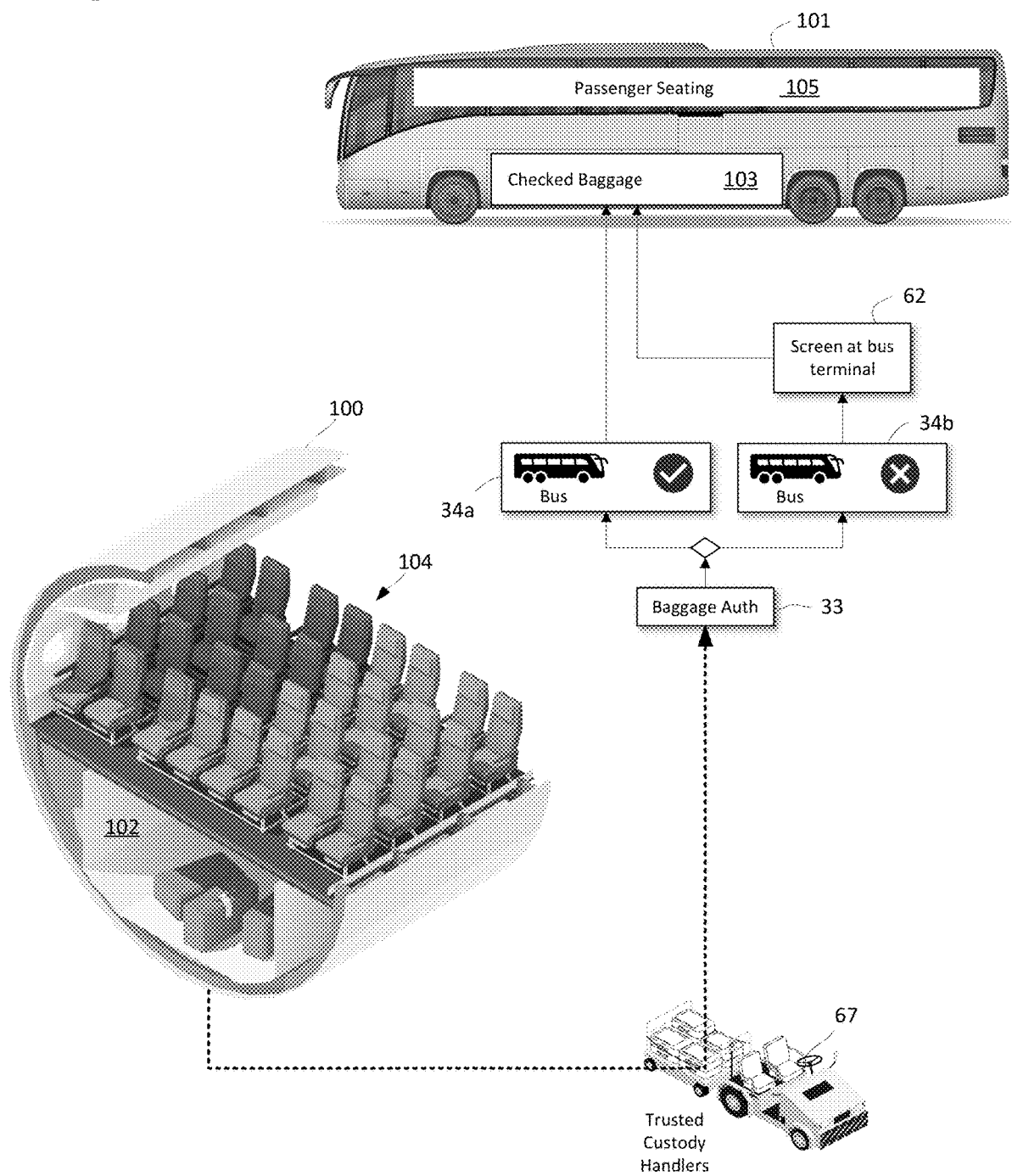
FIG. 2 is a diagrammatic view of an embodiment of the invention showing trusted custody between an airline and coach bus and or truck.

FIG. 2 illustrates the nature of checked baggage movement according to an embodiment of the invention. Aircraft 100 has a passenger cabin 104 and a checked baggage hold 102. Passengers before, during and after the flight have no ability to access checked baggage hold 102. Operator of aircraft 100 has custody of the checked bags in baggage hold 102. If the passenger was to take a coach bus 101 also having checked bag storage 103 and a separate passenger seating area 105 then trusted custody handlers 67 move passenger baggage between baggage hold 102 in aircraft 100 and checked bag storage 103 in coach bus 101. The bus line may require any bags that go into checked bag storage 103 to be screened for items under company and/or regulatory rules. However, in this case the baggage was reanalyzed under the rules and regulations for bus transport of which baggage authorization record 33 conveys either approval 34a or rejection 34b of the baggage. If approval 34a is present in the baggage authorization record 33 then the baggage may be moved directly from baggage hold 102 to checked bag storage 103 without additional screening. Alternatively, if baggage authorization record 33 indicates a rejection 34b of the baggage then it is screened again at bus terminal 62.

Figure 3:
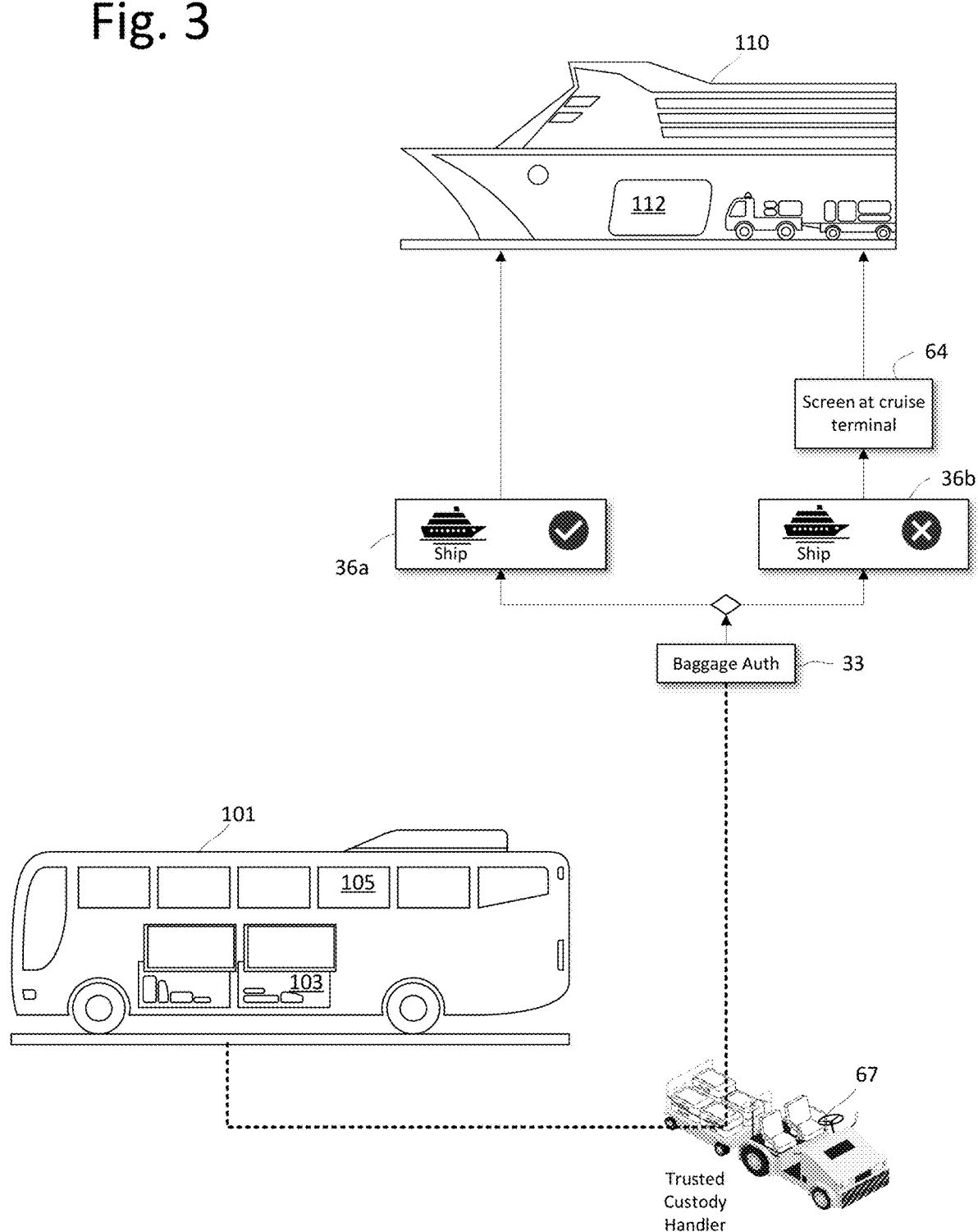
FIG. 3 is a diagrammatic view of an embodiment of the invention showing trusted custody between a coach bus and or truck and cruise ship.

FIG. 3 illustrates an analogous process where coach bus 101 arrives at a cruise ship terminal and baggage from checked bag storage 103 on coach bus 101 is received by trusted custody handler 67. Trusted custody handler 67 checks baggage authorization record 33 to see if the baggage can skip the cruise ship terminal screening 64 because it received approval 36*b* or if it must undergo screening at the cruise terminal because of a rejection 36*b*.

Figure 4:
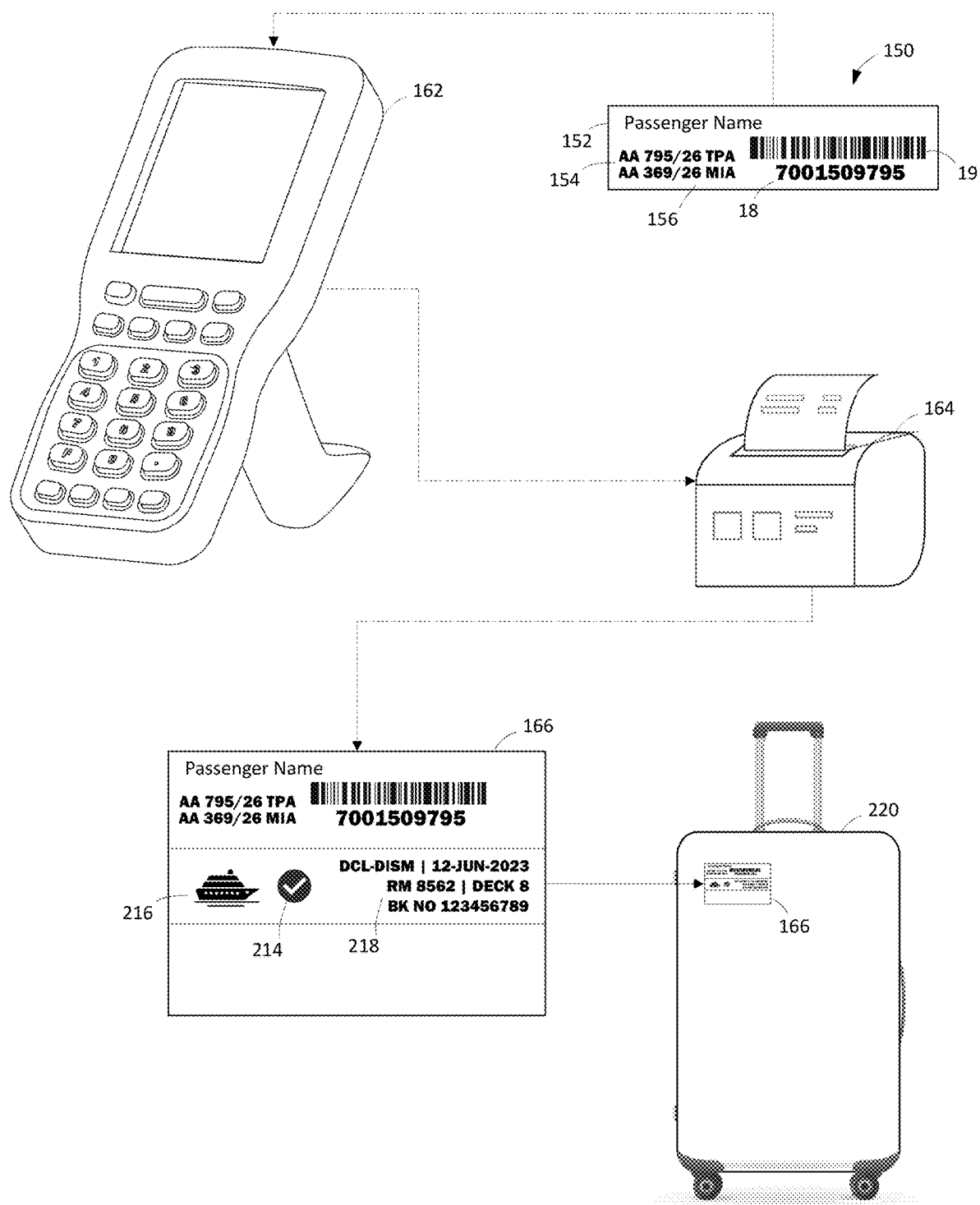
FIG. 4 is a diagrammatic view of an embodiment of the invention showing generation of baggage authorization indicia for bypassing additional baggage screening for two modes of travel.

In FIG. 4, a conventional airline bag tag marker 150 is shown. The airline bag tag marker 150 may include the passenger's name 152, origination airport flight identifier 154, destination airport flight identifier 156, a 10-digit license plate 18 and adjacent barcoded license plate 19 and or BSM record indicium. Bar code scanner 162 reads barcode 19. Scanner 162 is communicatively coupled to SSA 16 or a distributed datastore thereof which previously extrapolated associated travel records from TIS 20. Scanner 162 receives baggage authorization 33 generated by SSA 16 along with destination travel records from TIS 20 and directs printer 164 to generate a secure destination tag 166 incorporating the preexisting information from airline bag tag marker 150 with additional details retrieved from SSA 16, TIS 20 and the generated baggage authorization 33. In an embodiment of the invention, the cruise inline mode of the travel is represented by marine mode indicium 216 and the indication it has passed screening under the cruise line and government security rubric is presented by marine approval indicia 214. Additional details on the destination on a cruise ship for the baggage 220 are enumerated in cruise ship itinerary 218 which contains the cruise line, cruise ship, departure date, room number, deck number and booking number. From the airport to the cruise ship baggage 220 is in trusted custody 66 and only accessible by trusted custody handlers 67. In other words, the passenger or owner of baggage 220 does not have access to baggage 220 and therefore there is no opportunity to insert contraband or prohibited items since in the initial screening by FSA 12. It should also be noted that alternatively or in addition to the physical marking of the bag with tag 166 the same information may be electronically transmitted to the entities that handle and clear the bags for security. Thus, the same fields may be transmitted in a data payload such as Javascript Object Notation (JSON) to an API to convey substantially the same information that would otherwise be affixed directly to the bag. Provided the bag maintains its license plate and/or BSM indicium the bag is still trackable and communicating the security approval or rejection on the next mode of travel can be done electronically if desired.

Figure 5:
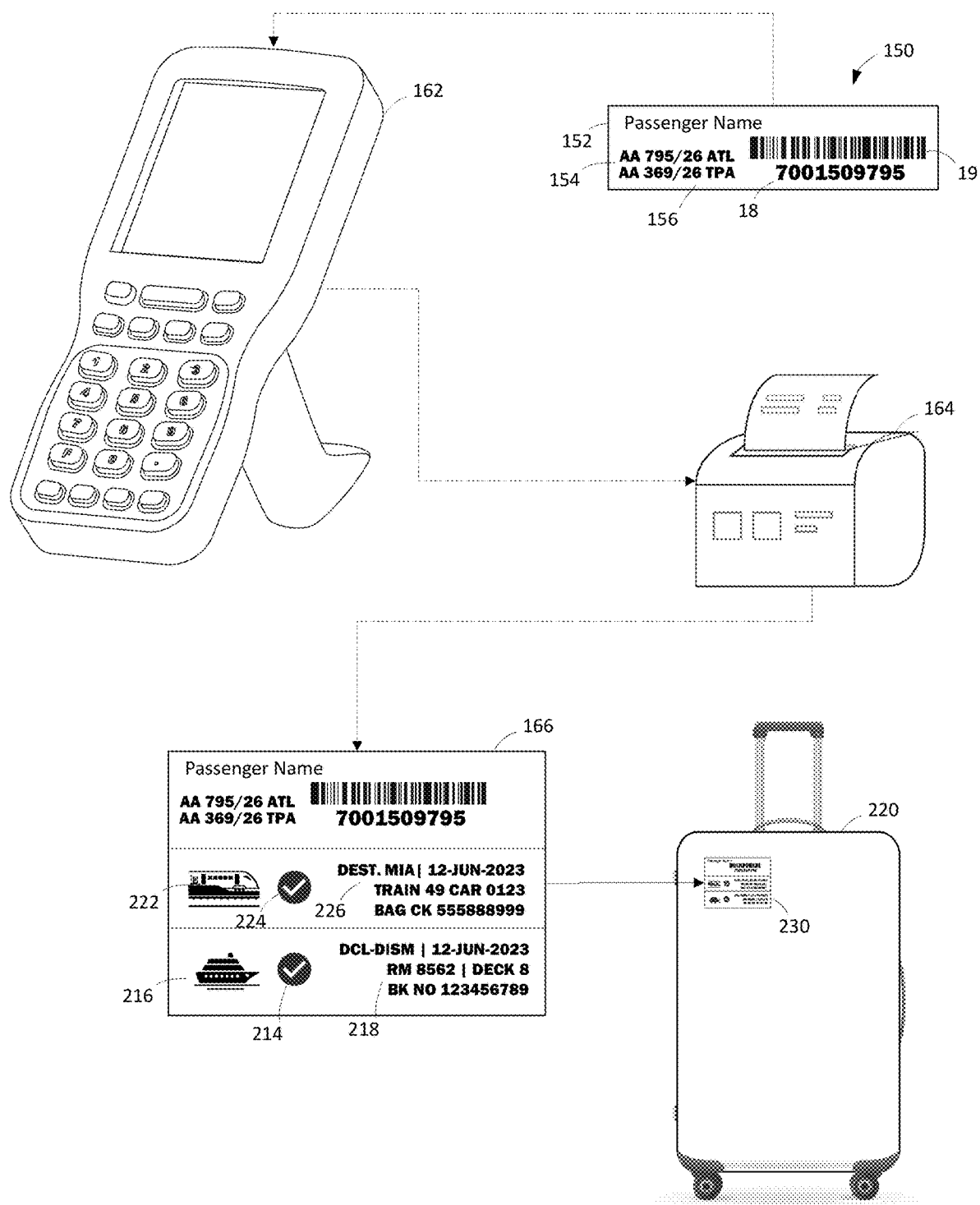
FIG. 5 is a diagrammatic view of an embodiment of the invention showing generation of baggage authorization indicia for bypassing additional baggage screening for three modes of travel.
Figure 6:
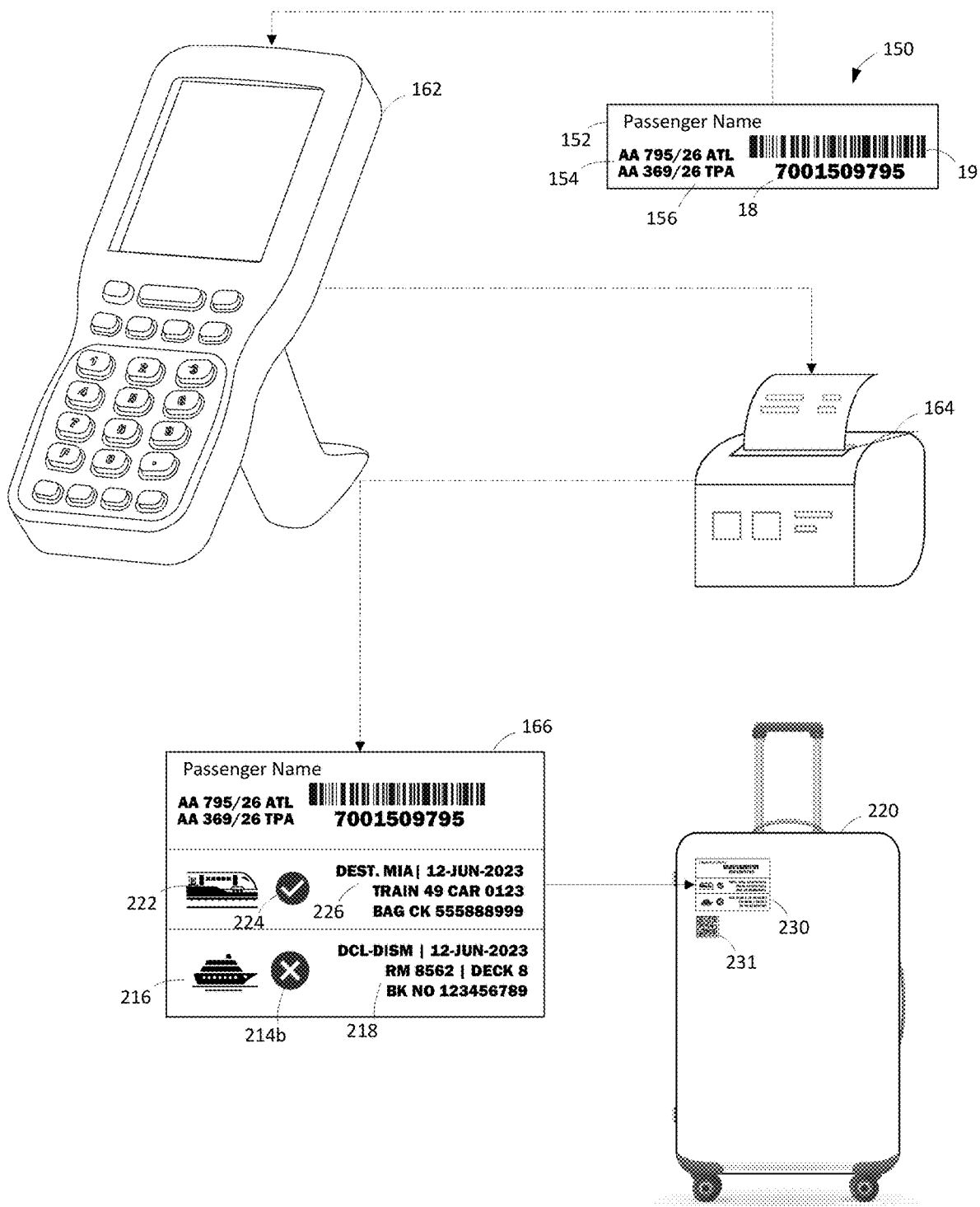
FIG. 6 is a diagrammatic view of an embodiment of the invention showing generation of baggage authorization indicia for bypassing additional baggage screening for three modes of travel wherein the final mode of travel is flagged for additional screening.

FIG. 5 shows an embodiment of the invention where multiple modes of travel are prescreened and approved for movement in trusted custody 66. In this case, rail mode indicium 222 indicates baggage 220 will go from airline to rail travel and rail approval indicia 224 conveys it is prescreened for that mode of travel with a positive approval result. Details of the rail travel are conveyed in rail itinerary 226 which gives information to trusted custody handlers 67 on delivering baggage 220 to the proper destination. FIG. 6 is a variation in the process where marine rejection indicia 214*b* conveys that baggage 220 was prescreened by SSA 16 but did not pass reanalysis screening 30. This is more valuable than simply omitting the result because it facilitates rescreening at the cruise terminal by conveying there is something present of concern. Accordingly, while the process both saves time, labor, and capital by skipping cruise terminal screening for SSA-screened bags, it also enhances security for all crew and passengers because ultimately the baggage of concern would have been screened three times in the process and specifically noted for additional screening. In an embodiment of the invention, each reanalysis screening 30 generates a unique identifier associated with the baggage 220 so that details of the reanalysis can be associated with baggage 220. The unique identifier may be a globally unique identifier (GUID) such as 1b1731b6-ae67-4df8-a8e9-eb7e625382bf. The GUID is printed as a machine readable adhesive GUID label 231 and affixed to baggage 220. At the cruise ship terminal screening, GUID label 231 is scanned and securely linked to results from the reanalysis screening 30 including specific articulation of the non-compliant issues and annotations on the images themselves to facilitate the cruise ship terminal screening process.

Figure 7:
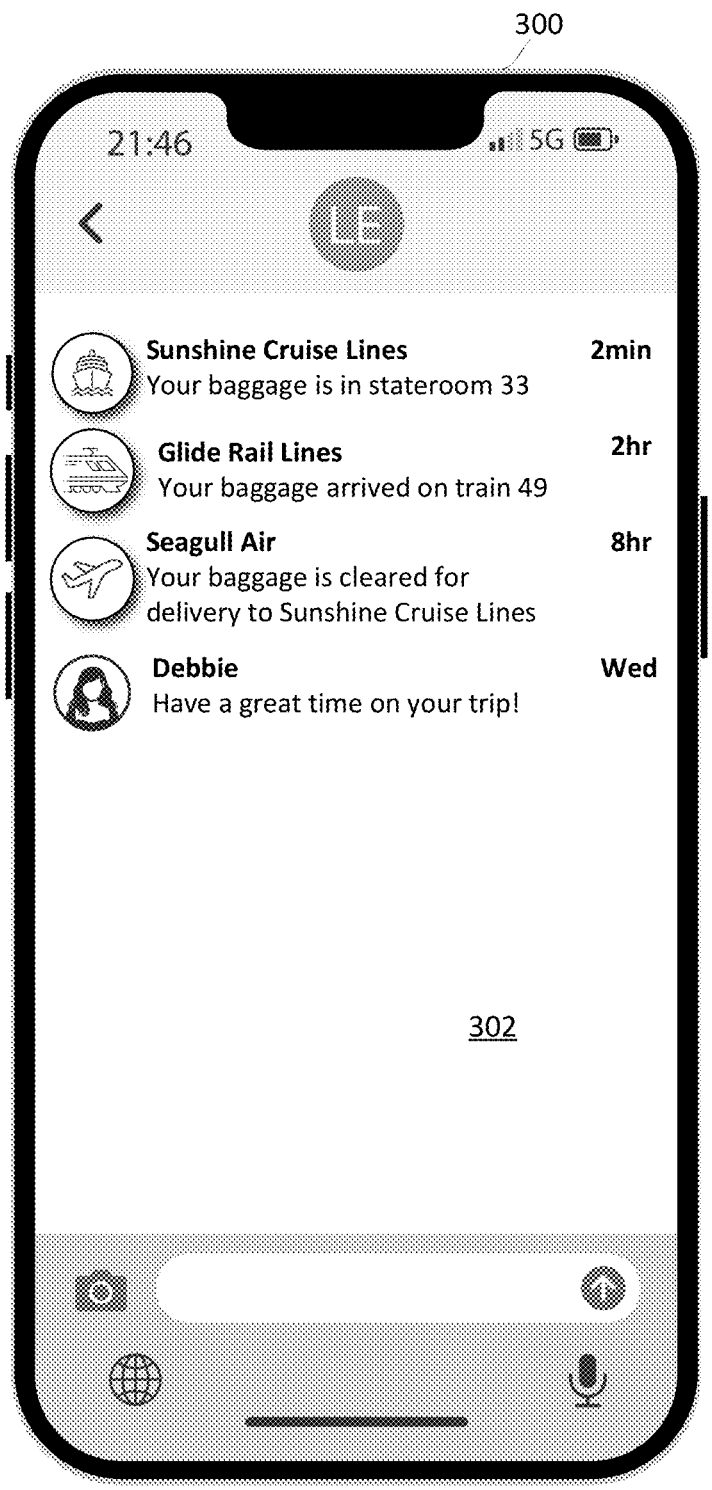
FIG. 7 is a conceptual messaging graphic user interface on a mobile phone conveying the movement process of a passenger's baggage.
Figure 8:
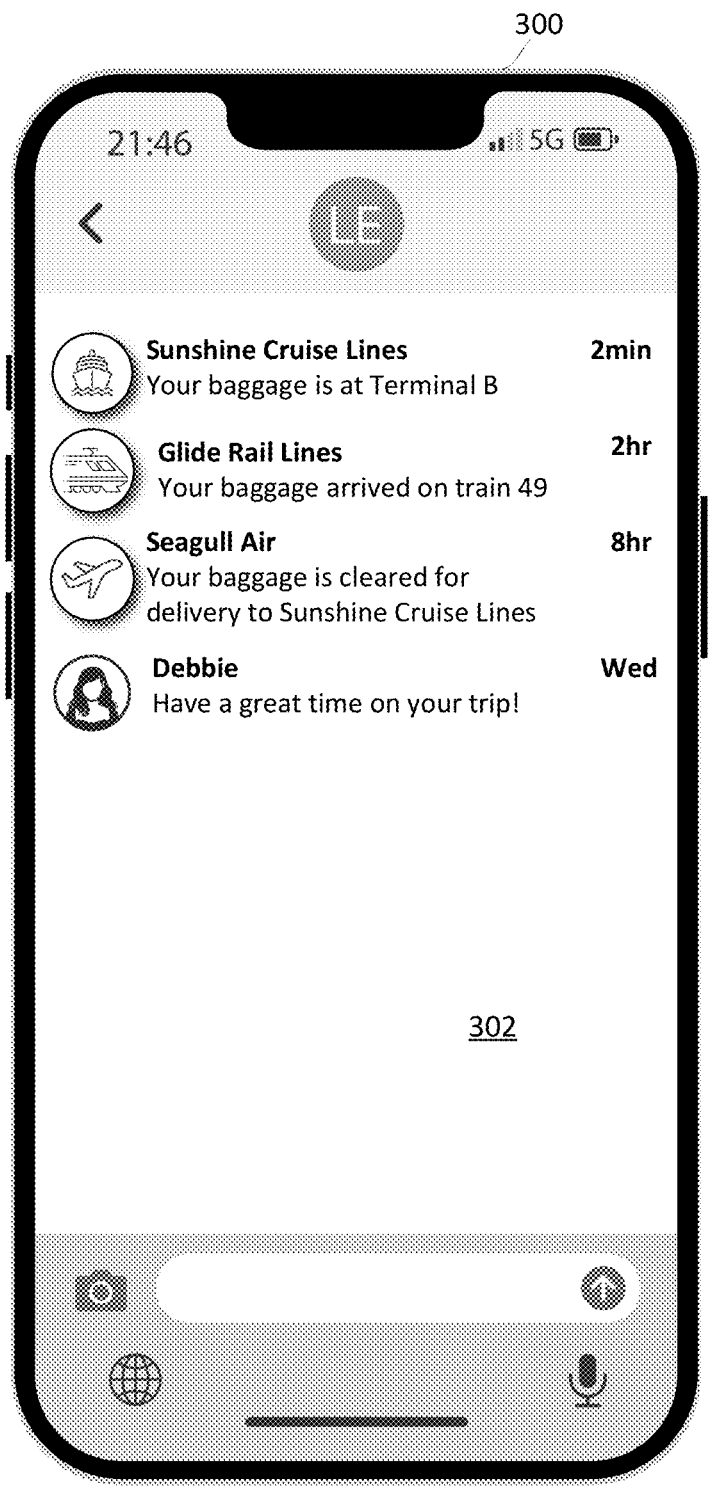
FIG. 8 is a conceptual messaging graphic user interface on a mobile phone conveying the movement process of a passenger's baggage wherein a rescreening is required.

FIG. 7 show user interface 302 on a mobile device 300 conveying information on the status of the baggage 220. In this embodiment, an enterprise messaging system sends SMS (short message service) messages to passengers on the status and location of their baggage. In this thread of messages, reanalysis screening 30 occurred while the passenger was in flight which indicated the baggage passed all screening criteria for both rail and the cruise line. Therefore, rather than having the passenger pick up their baggage at the destination airport, carry them to the rail terminal (where they are screened a second time) and then carry them from the rail destination station to the cruise terminal (where they are screened a third time), they simply go to their statement on the cruise ship and their bags are already there. Furthermore, both the rail line and the cruise line benefit from a streamlined process using the CT scanning at the airport once. The messaging may come directly from SSA 16 on behalf of the travel entities or the status of the bags including the baggage authorization manifest 33 maybe obtained via secure application programming interface (API) requests. In this manner, mobile apps from the cruise lines, railways and airlines may integrate this information directly into their own digital ecosystem. Like FIG. 7, the passenger is notified of the baggage status but in this case, it did is not authorized for direct delivery to the cruise ship stateroom of the passenger. Therefore, the passenger is notified that the baggage will be sent to Terminal B of the cruise ship port where it can be screened there.

HARDWARE AND SOFTWARE INFRASTRUCTURE EXAMPLES

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICE, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

GLOSSARY OF TERMS

Authorized personnel: Individuals who are granted permission to access the stored baggage imagery for the purpose of reanalyzing it according to the rules and regulations specific to their mode of transportation.

Automated image analysis algorithms: Computer programs designed to analyze and evaluate images, such as scanned baggage imagery, for specific criteria related to the rules and regulations of different modes of transportation.

Baggage: Luggage or other personal items carried by a traveler during their journey, including suitcases, backpacks, and cargo containers.

Baggage Source Message (BSM) means an electronic message standard used in the airline industry to communicate essential information about checked baggage between airline systems and automated baggage handling systems at airports. The BSM includes specific details such as the passenger's name, flight details (including departure and arrival airports, flight number, and date), the baggage tag number, and the intended routing information. This structured data is used to accurately sort and direct the baggage to the appropriate aircraft, ensuring it reaches the correct destination or any connecting flights as required. The functionality of BSMs is a critical component in minimizing the incidence of lost or misdirected baggage.

Graphical user interface: A visual interface that allows users, such as authorized personnel, to interact with a computer system or software, including viewing, annotating, and flagging baggage imagery.

Imaging system: A device or equipment used for capturing images of baggage during the screening process, including X-ray machines, computed tomography (CT) scanners, and other imaging technologies.

Itinerary: A detailed plan or schedule of a traveler's journey, including information about flights, accommodations, and other modes of transportation.

License Plate: A unique identifier or barcode that is attached to each piece of luggage when it is checked in. This is also known as a baggage tag or baggage label. This unique "license plate" is embedded with crucial details such as a distinctive 10-digit identifier for baggage tracking, information about the passenger's flight number, and their destination. Furthermore, it features a barcode that can be scanned at various stages of the baggage handling process. This allows the baggage handling system to accurately route each piece of luggage to the correct aircraft and also provides the ability to locate a bag in case it is misrouted or lost. The passenger retains a section of this tag, serving as a receipt for identification and claim purposes. This concept mirrors the license plate system used for vehicles, where each plate has a unique identifier that enables tracking.

Rescreening: The process of reexamining baggage that has been flagged as non-compliant with the rules and regulations of a specific mode of transportation, which may involve physical inspection or additional scanning.

Rules and regulations: Guidelines and requirements established by regulatory bodies or companies operating in various modes of transportation, such as cruise lines, rail, and bus services, to ensure the safety and security of passengers and their belongings.

Secure cloud storage system: A remote data storage service that uses encryption and access control measures to protect the privacy and security of the stored data, such as scanned baggage imagery.

Transportation security authority (TSA): A government agency responsible for the security of travelers and their baggage at airports, ensuring the safety of passengers, crew, and aircraft.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method for streamlining baggage screening across a plurality of modes of transportation, the method comprising:
    scanning a baggage item by a first security authority (FSA) using a computed tomography imaging system that exports imagery of the baggage item to a baggage imagery collection;
    scanning machine-readable baggage indicia of the baggage item for a bag identification record selected from the group consisting of a license plate identification and a Baggage Source Message (BSM) identification, the bag identification record uniquely identifying the baggage item and associated passenger data;
    uploading the baggage imagery collection and the bag identification record to a secure cloud storage system administered by a second screening authority (SSA), the baggage imagery collection linked to the bag identification record;
    extrapolating a screening manifest at the SSA from the bag identification record, the screening manifest enumerating at least one second mode of transportation that requires baggage screening under rules and regulations specific to the at least one second mode of transportation that are different from rules and regulations applied by the FSA;
    for the at least one second mode of transportation identified in the screening manifest, reanalyzing the baggage imagery collection by the SSA according to the rules and regulations specific to the at least one second mode of transportation;
    determining whether the scanned baggage item complies with the rules and regulations specific to the at least one second mode of transportation identified in the screening manifest and creating a baggage authorization record enumerating a security compliance result for the at least one second mode of transportation in the screening manifest, the security compliance result represented by at least one of an indicium affixed to the baggage item and an electronic compliance result transmission; and
    approving or prohibiting direct delivery of the baggage item by a trusted custody handler for the at least one second mode of transportation indicated in the indicium whereby if the indicium reports a positive security compliance result for the at least one second mode of transportation, the trusted custody handler may directly deliver the baggage item to the at least one second mode of transportation without additional, physical security screening, and if the indicium reports a negative security compliance result for the at least one second mode of transportation, the baggage item is sent for physical security screening at a holding location or at the at least one second mode of transportation.

2. The method of claim 1, further comprising using a Digital Imaging and Communication in Security (DICOS) standard for the baggage imagery collection by the first security authority (FSA).

3. The method of claim 1, further comprising extracting a passenger name record (PNR) from the bag identification record by the first security authority (FSA) to obtain a travel plan of an owner of the baggage item.

4. The method of claim 1, further comprising generating a hash of the bag identification record at the secure cloud storage system administered by the second screening authority (SSA), such that passenger details are not known to an entity conducting the reanalysis of the baggage imagery collection.

5. The method of claim 1, further comprising affixing an adhesive label to the baggage item, wherein the adhesive label comprises symbols indicating positive or negative security compliance results.

6. The method of claim 1, further comprising including information on why the negative security compliance result was returned in the reanalysis screening of the baggage imagery collection.

7. The method of claim 1, further comprising visually annotating the baggage imagery collection during the reanalysis screening to highlight an object that caused the negative security compliance result.

8. The method of claim 1, further comprising electronically sending a message to an owner of the baggage of item of the positive or negative security compliance result for the at least one second mode of transportation.

9. The method of claim 8, further comprising including an explanation selected from an array of standardized explanations in the message to the owner of the baggage item regarding the negative security compliance result.

10. The method of claim 1, further comprising advancing an annotated image of an ala object that caused the negative security compliance result to a security screening entity at the at least one second mode of transportation.

11. The method of claim 10, further comprising encrypting the annotated image of the object that caused the negative security compliance result with a public/private key pair by the second screening authority (SSA).

12. The method of claim 11, further comprising signing the encrypted annotated image of the object that caused the negative security compliance result with a public/private key pair by the second screening authority (SSA).

13. A system for streamlining baggage screening across a plurality of modes of transportation, administered by a second screening authority (SSA), the system comprising:
    a. a secure cloud storage system for receiving and storing, from a baggage item, baggage imagery collections and associated machine-readable baggage indicia for a bag identification record selected from the group consisting of a license plate identification and a Baggage Source Message (BSM) identification, the baggage item and the machine-readable baggage indicia scanned by a first security authority (FSA), the baggage imagery collections linked to the baggage identification record;
    b. a screening manifest extrapolated from the baggage identification record, the screening manifest enumerating at least one second mode of transportation that requires baggage screening under rules and regulations specific to the at least one second mode of transportation that are different from rules and regulations applied by the FSA;
    c. a reanalysis of the baggage imagery collections according to the rules and regulations specific to the at least one second mode of transportation identified in the screening manifest;
    d. a compliance determination of whether the reanalyzed baggage imagery collections comply with the rules and regulations specific to the at least one second mode of transportation identified in the screening manifest and a creation of a baggage authorization record enumerating a security compliance result for the at least one second mode of transportation in the screening manifest, the security compliance result represented by at least one of an indicium affixed to the baggage item and an electronic compliance result transmission; and e. an indicium communicating the security compliance result to a trusted custody handler, wherein if the indicium reports a positive security compliance result for the at least one second mode of transportation, the trusted custody handler may directly deliver the baggage item to the at least one second mode of transportation without additional, physical security screening, and if the indicium reports a negative security compliance result for the at least one second mode of transportation, the baggage item is sent for physical security screening at the at least one second mode of transportation.

14. The system of claim 13, further comprising an adhesive label affixer for affixing an adhesive label to the baggage item, wherein the adhesive label comprises symbols indicating positive or negative security compliance results.

15. The system of claim 13, further comprising information on why the negative compliance result was returned in the reanalysis screening of the baggage imagery collections.

16. The system of claim 13, further comprising a visual annotation for visually annotating the baggage imagery collections during the reanalysis screening to highlight an object that caused the negative security compliance result.

17. The system of claim 13, further comprising a notification for notifying an owner of the baggage item of the negative security compliance result for the at least one second mode of transportation.

18. The system of claim 17, further comprising a standardized explanation in the notification to the owner of the baggage item regarding the negative security compliance result.

19. The system of claim 13, further comprising an annotated image of an object that caused the negative security compliance result sent to a security screening entity at the at least one second mode of transportation.

20. A non-transitory computer-readable medium having instructions stored thereon that, when executed by at least one processor, cause the at least one processor to perform a method for streamlining baggage screening across a plurality of modes of transportation, the method comprising:

a. scanning a baggage item using a computed tomography imaging system that exports imagery of the baggage item to a baggage imagery collection;
b. scanning at least one of a machine-readable license plate identification of the baggage item and a machine-readable Baggage Source Message (BSM) of the baggage item to generate a bag identification record that uniquely identifies the baggage item and associated passenger data;
c. uploading the baggage imagery collection and the bag identification record to a secure cloud storage system;
d. extrapolating a screening manifest from the bag identification record, the screening manifest enumerating at least one second mode of transportation that requires baggage screening under rules and regulations specific to the at least one second mode of transportation that are different from rules and regulations applied by a first security authority (FSA);
e. reanalyzing the baggage imagery collection according to the rules and regulations specific to the at least one second mode of transportation identified in the screening manifest;
f. determining whether the reanalyzed baggage imagery collection complies with the rules and regulations specific to the at least one second mode of transportation identified in the screening manifest and creating a baggage authorization record enumerating a security compliance result for the at least one second mode of transportation in the screening manifest, the security compliance result represented by at least one of an indicium affixed to the baggage item and an electronic data transmission; and
g. approving or prohibiting direct delivery of the baggage item by a trusted custody handler for at least one second mode of transportation indicated in the indicium whereby if the indicium reports a positive security compliance result for the at least one second mode of transportation, the trusted custody handler may directly deliver the baggage item to the at least one second mode of transportation without additional, physical security screening, and if the indicium reports a negative security compliance result for the at least one second mode of transportation, the baggage item is sent for physical security screening at a holding facility or directly to the at least one second mode of transportation.

* * * * *